United States Patent [19]

MacKay et al.

[11] Patent Number: 4,725,309
[45] Date of Patent: Feb. 16, 1988

[54] METHOD AND APPARATUS FOR PRODUCING HOT DIRECT REDUCED IRON

[75] Inventors: Patrick W. MacKay, Garza Garcia; Ronald-Victor-Manuel Lopez-Gomez; Raul Prieto-de-la-Fuente, both of San Nicolas de los Garza; Marco-Aurelio Flores-Verdugo, Apodaca, all of Mexico

[73] Assignee: Hylsa, S.A., Monterrey, Mexico

[21] Appl. No.: 840,384

[22] Filed: Mar. 17, 1986

[51] Int. Cl.$^4$ .......................... C21B 13/02; F27B 1/24
[52] U.S. Cl. .......................................... 75/34; 266/193
[58] Field of Search ............................... 75/26, 33-37, 75/90, 91; 266/190-193, 197, 241; 432/83; 222/146.6

[56] References Cited

U.S. PATENT DOCUMENTS

| | | |
|---|---|---|
| 512,053 | 1/1894 | Nesmith . |
| 981,280 | 1/1911 | Jones . |
| 1,227,127 | 5/1917 | Fogler . |
| 1,284,094 | 11/1918 | Grouselle . |
| 1,319,589 | 10/1919 | Jones . |
| 1,517,402 | 12/1924 | Constant et al. . |
| 1,599,885 | 9/1926 | Grace . |
| 1,969,264 | 8/1934 | Grant . |
| 2,384,971 | 9/1945 | Silvasy et al. . |
| 2,418,394 | 4/1947 | Brown . |
| 2,503,555 | 4/1950 | Lykken . |
| 2,548,876 | 4/1951 | De Jahn et al. . |
| 2,862,808 | 12/1958 | De Jahn . |
| 3,450,396 | 6/1969 | Pantke et al. . |
| 3,467,368 | 9/1969 | Celada et al. . |
| 3,591,158 | 7/1971 | Pante et al. . |
| 3,799,367 | 3/1974 | Grewer et al. . |
| 4,256,290 | 5/1981 | Coccia . |
| 4,290,587 | 9/1981 | Coccia . |
| 4,407,489 | 10/1983 | Oberndorfer . |

Primary Examiner—Melvyn J. Andrews
Attorney, Agent, or Firm—A. Thomas S. Safford

[57] ABSTRACT

A method and an apparatus for the gaseous reduction of particulate iron ores is disclosed, wherein the reduced ore, commonly called DRI (Direct Reduced Iron) or sponge iron, is treated in a vertical shaft moving bed furnace and discharged from said furnace in solid particulate form at high temperature, e.g. above 500° C. The shaft furnace is of the type wherein a bed of particles descends by gravity through said furnace which has an upper section where ore pellets, lumps, or the like are reduced by reaction with a hot reducing gas, and a lower section of a downwardly tapering, preferably, in a generally conical shape, which converges to an outlet discharge orifice of smaller cross sectional area than the rest of said furnace. A heat-exchanging means, optionally combined with insulation, in contact with the external surface of the wall of said lower section permits control of the temperature of said wall, whereby solids-flow problems in the furnace are minimized, producing a smooth operation and the desired hot exit temperature of the discharged DRI all in a reactor of a practical foreshortened size.

20 Claims, 3 Drawing Figures

METHOD AND APPARATUS FOR PRODUCING HOT DIRECT REDUCED IRON

FIELD OF THE INVENTION

This invention relates to the gaseous direct reduction of iron oxides in moving bed shaft furnace wherein a moving bed of particles descends by gravity through said furnace, and more particularly, to a method and apparatus for discharging the reduced iron particles at high temperatures, suitable for hot briquetting or immediate melting, while permitting a practical and economical design of the shaft furnace and of its ancillary equipment for solids handling, along with energy conservation in the overall process. This invention is also applicable to other types of vessels for handling particles containing metallic iron at high temperature, as for example, storage bins or silos.

BACKGROUND OF THE INVENTION

There are known in the art several designs for reducing a descending bed of iron ore particles in a moving bed particles reduction reactor countercurrently with an ascending stream of reducing gas, typically comprising hydrogen and carbon monoxide. These furnaces are generally cylindrical and are insulated and refractory lined so that the metallic walls of the furnace vessel withstand the high reduction temperature, on the order of 800° C. to 1100° C., and withstand also the abrasion and pressure of the descending bed of particles.

So that all particles are uniformly reduced and in order to obtain a product of homogenous composition, it is necessary to design the shaft furnace for a mass-flow of particulate solids. The term mass-flow, as used in the art, means that solids move in all regions of the volume of the bed of solids in the vessel. It is also particularly desirable to design the shaft furnace to produce a uniform flow of particles through the reduction section of said furnace. This means that all particles travel in a plug flow, i.e. at the same velocity, and consequently, have the same residence time within said reduction section. Also, great care is exerted for assuring an effectively uniform countercurrent flow of gases through the furnace by proper design of gas inlets and outlets.

Residence time of solids is regulated by a suitable mechanism, located at the bottom of the furnace, which regulates the rate of discharge of solids. This mechanism can be rotary or star-type feeders, vibratory feeders, etc. well known in the art. See as preferred, U.S. pat. No. 4,427,135 issued to one of the present applicants and his co-workers. So that the discharge mechanism is of a practical size, the solids discharge outlet at the bottom of the furnace is of a cross sectional area smaller than the cross sectional area of the reduction section, and for this reason the lower section of the furnace, typically, takes the shape of a downwardly converging cone.

It is known that in order to maintain plug flow in the cylindrical reduction zone, one must have mass flow of particles in the discharge cone, i.e. said particles must flow in all regions of the volume occupied by said particles, including those in contact with the furnace walls. To this end, the angle of the conical section must be selected according to the flow characteristics of said particles, both in respect to each other and in respect to the material and conditions of the internal surface of the conical wall (e.g. temperature, size distribution, roughness of surface, etc.). The angle is chosen so as to avoid bridging to form arches or domes of the particles within the furnace, which would interrupt the gravity flow. This is particularly critical when treating potentially sticky or cohesive particles, for example, hot direct reduced iron (also known as DRI or sponge iron).

It would seem logical that in order to discharge DRI at high temperature, it would be necessary to avoid heat loss which in turn would indicate that heat should not be removed from the conical wall. This would suggest putting the same insulating and refractory material covering on the wall of the conical section as is usually placed on the wall of the cylindrical reduction section of these furnaces in order to minimize heat loss.

However, applicants have recognized that the roughness of the refractory materials impedes the flow of the particles through the discharge cone, requiring a steeper conical wall in order to maintain the necessary mass flow of the particles in the cone. Furthermore, applicants have also discovered that the flow characteristics of DRI change with temperature, giving an increase in apparent friction with a corresponding increase in temperature. This again requires a steeper wall for the discharge cone.

On the other hand, in practice, it would not be feasible to build direct reduction furnaces having steeper conical walls than required to discharge DRI at low temperatures as is presently done, because those furnaces would be too long and costly, or the discharge opening would be too large. Furthermore, the particles would tend to consolidate or stick due to the longer residence times at high temperatures within the furnace, resulting from the longer cone.

In an attempt to solve the above problems, it has been proposed in the past to operate internal mechanisms to promote the flow of solids. This alternate solution is not practical because said mechanisms operate under very severe inside conditions inside the reduction furnace, and also, because they obstruct uniform flow and generate undesirable fines.

Since there is a great interest in discharging DRI at the highest possible temperature suitable for immediate melting or immediate hot briquetting, the need still exists for producing DRI at a temperature above at least 500° C., and preferably, above 700° C.

This invention is directed to solving these contradictory requirements in a novel and counterintuitive fashion that is particularly advantageous and useful in the art.

It is accordingly an object of the present invention to provide a method and apparatus for producing hot DRI in an economical and practical way.

It is another object of the invention to provide a method and apparatus for discharging by gravity hot DRI from a vertical shaft furnace without solids flow problems and with good quality.

It is a further object of the invention to provide a method and apparatus for maintaining the overall shorter size of the lower discharge section of the furnace similar to those with a cold discharge so that the hot DRI particles flow by gravity, and at the same time, permit the average bulk temperature of DRI to be maintained at a level suitable for immediate melting or hot briquetting.

SUMMARY OF THE INVENTION

The present invention provides a method and an apparatus for producing DRI at high temperatures in a practical and economical way by selectively cooling the conical wall of the furnace to lower its temperature. The internal surface of said wall is preferably made from relatively smooth metal to promote the flow of DRI particles. By controlling the temperature of the wall in selected areas, the temperature of the particles that are in direct contact with said wall is lowered so that friction between said particles and said metallic wall is kept within acceptable values for solids flow by gravity. Heat loss from said particles is controlled and minimized. At the same time, the tendency of inter-particle sticking, for those particles at or near the wall, is also lowered. Surprisingly, the cooling of the particles at the wall does not cool significantly particles remote from the wall. Thus, the desired hot discharge is maintained. In a preferred embodiment, control of temperature is achieved by regulating the amount of cooling fluid circulating through cooling jackets in contact with the wall and, if appropriate, by insulating the lowest portion of the discharge of the cone of said furnace.

BRIEF DESCRIPTION OF THE DRAWINGS

In this specification and the accompanying drawings, applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

DETAILED DESCRIPTION OF THE INVENTION

The invention will be described as preferably embodied in a direct reduction shaft furnace for reducing particles of iron ores in the form of lumps or pellets or mixtures thereof. It will be evident to those skilled in the art that the invention in its broader aspects can be applied to other types of vessels for handling particles containing metallic iron at high temperature, as for example, storage bins or silos.

Figure 1:
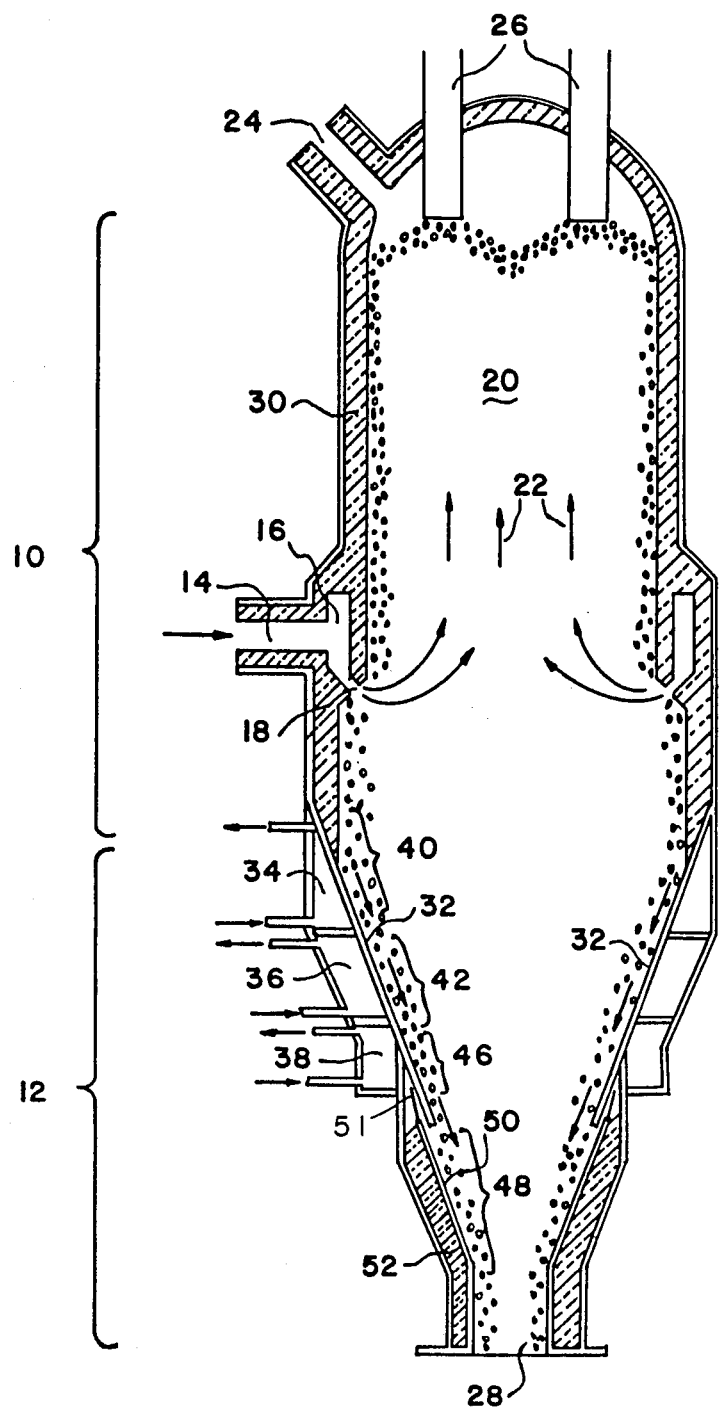
FIG. 1 is a vertical cross section of apparatus incorporating a preferred embodiment of the present invention.

Referring to FIG. 1, a shaft furnace is shown comprising an upper section 10, typically, of a cylindrical shape and which is insulated and refractory lined, wherein a descending bed of iron ore particles is contacted countercurrently with an ascending stream of hot reducing gas to convert said iron ore to metallic iron.

Iron ore particles are fed to the shaft furnace by means of at least one feed pipe 26, which with cooperation of the top of said furnace, forms a gas disengaging plenum communicating with gas outlet 24, through which exhausted reducing gas exits said furnace.

The bed of particles 20 is heated by the hot reducing gas entering said furnace through gas inlet 14, said gas then flows to distribution plenum 16 and is evenly distributed and fed to said bed by means of feeding orifices 18. These orifices may take the form of a continuous plenum in certain cases. Bed 20 reaches its maximum temperature, on the order of 700° C. to 1000° C., in the proximity of the point of entry of the reducing gas and then continues flowing downwardly through lower section 12 of the furnace.

Section 12 is of a conical shape tapering to a solids discharge outlet 28, and has a smooth metallic surface, made of carbon steel, in direct contact with the hot DRI particles. Conical wall 32 is surrounded by a plurality of heat-exchanging jackets 34, 36, and 38, each one having separate means for circulating a cooling fluid therethrough, preferably, liquid water or steam, with respective regulating means (not shown) of conventional type for selectively controlling or stopping the amount of cooling fluid that is circulating through said jackets so that the temperature of the wall, and consequently, of the DRI particles at regions 40, 42 and 46, is maintained at desired levels for assuring a uniform and smooth flow of the DRI bed through the furnace.

At the lowest portion of said conical section 12 there is a metallic wall 50 affixed to the vessel defined by wall 32 by suitable supporting means 51 and which permits thermal expansion and deformation of this wall 50 as may be required by the temperature of the DRI particles in contact therewith. Wall 50, optionally, is surrounded by a layer of insulating material 52 when necessary to minimize heat loss, and is enclosed by continuation of wall 32.

By regulating the amount of cooling fluid circulating through jackets 34, 36 and 38, the layers of particles that are in contact with region 40 of wall 32 are brought down to levels of 100° C. to 300° C., so that a uniform flow of solids is obtained through reduction section 10 by assuring the proper mass flow conditions in the conical bottom 12.

In view of this disclosure, it will be evident to those skilled in the art that the cooling rates and relative dimensions of the cooling jackets and of the insulated portion of the cone can be properly adjusted in a given design to advantageously achieve a desirable average temperature of the discharged DRI.

In some embodiments of this invention, the insulated portion 48 of the cone may be minimal, nonexistent, or replaced by a further cooling jacket (not shown), depending on the flow characteristics, the temperature at which the ore is to be reduced in the reduction section of the furnace, and the desired outlet temperature of the DRI, etc.

As the bed of particles 20 moves downwardly to flow through the bottom conical segment 12, the diameter of the furnace decreases and a velocity gradient is established between the centerline and the wall of the cone in such a manner that the particles near the center flow faster than the particles nearer the wall. As they descend, the average velocity of all particles increases with regard to the velocity above any given level in the cone. This is graphically illustrated in FIG. 2, as calculated for a given assumed material and wall surface, where the top of the conical section 12 (where it internally meets section 10) is represented by $R_1$, and the bottom outlet of the section 12 is represented by $R_2$, with $R_i$ representing an intermediate position in the center of section, 12. Thus the curve of $R_2$ shows the difference in velocity from the wall (angle 16°) to the centerline (angle 0°) at the outlet. The difference in velocity shown by the curve for $R_1$ at the top of conical section 12, can be seen to be quite small (although the shape of the curve is very similar, if shown as an expanded scale).

As the particles contact the water-cooled surface 32 at section 40, the layer of particles nearest the wall is cooled down so that the hot bed of particles moves downwardly upon a boundary layer of cool particles that flows along the wall without requiring an excessively steep wall angle.

Figure 2:
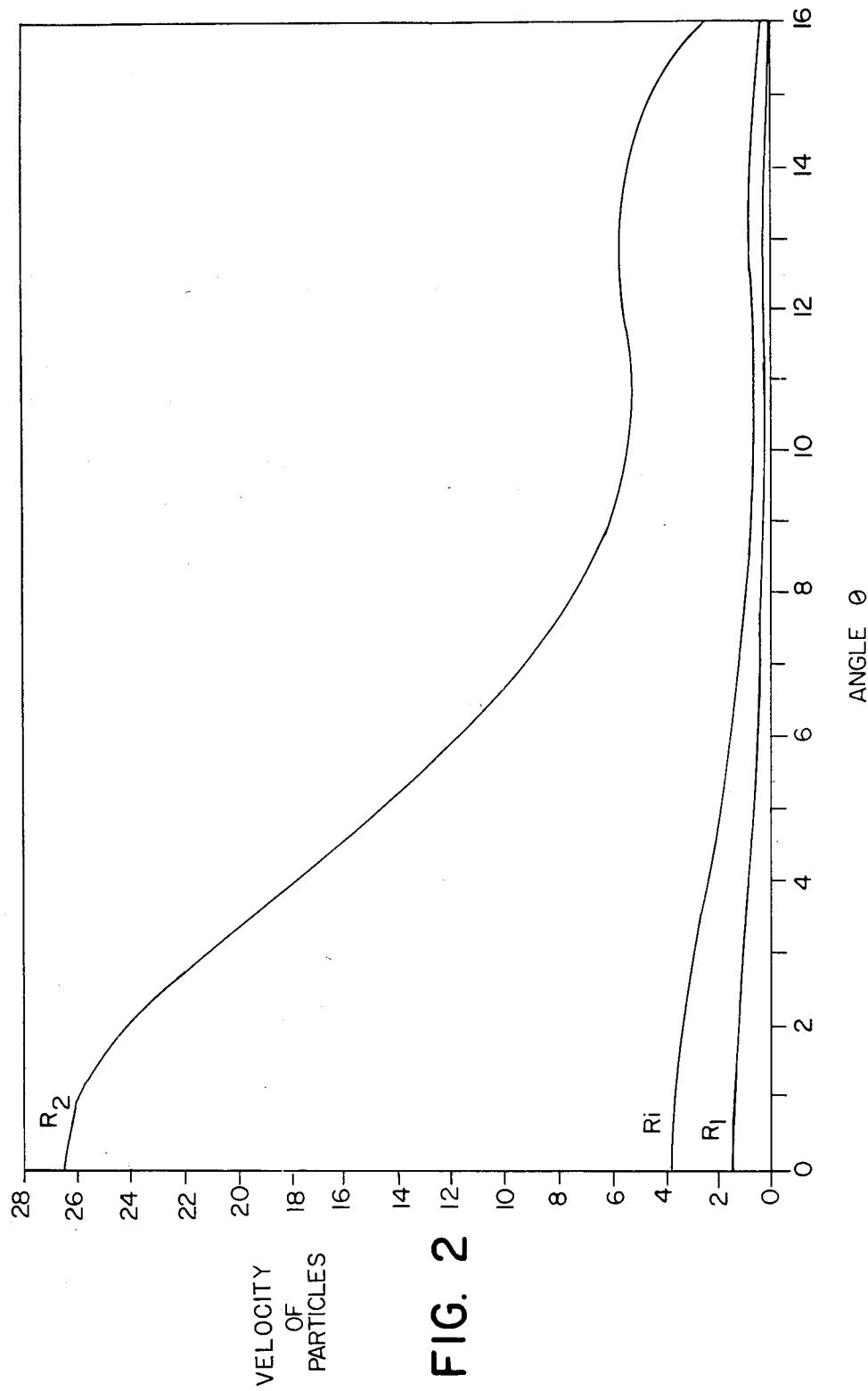
FIG. 2 is a graph showing the relative velocity of particles along conical radii at different conical angles (from the centerline of a given typical discharge cone to its outer wall i.e. $0 \leq \theta \leq 16°$) for three different heights in the cone, i.e. $R_1$, $R_i$, and $R_2$ (see FIG. 3)
Figure 3:
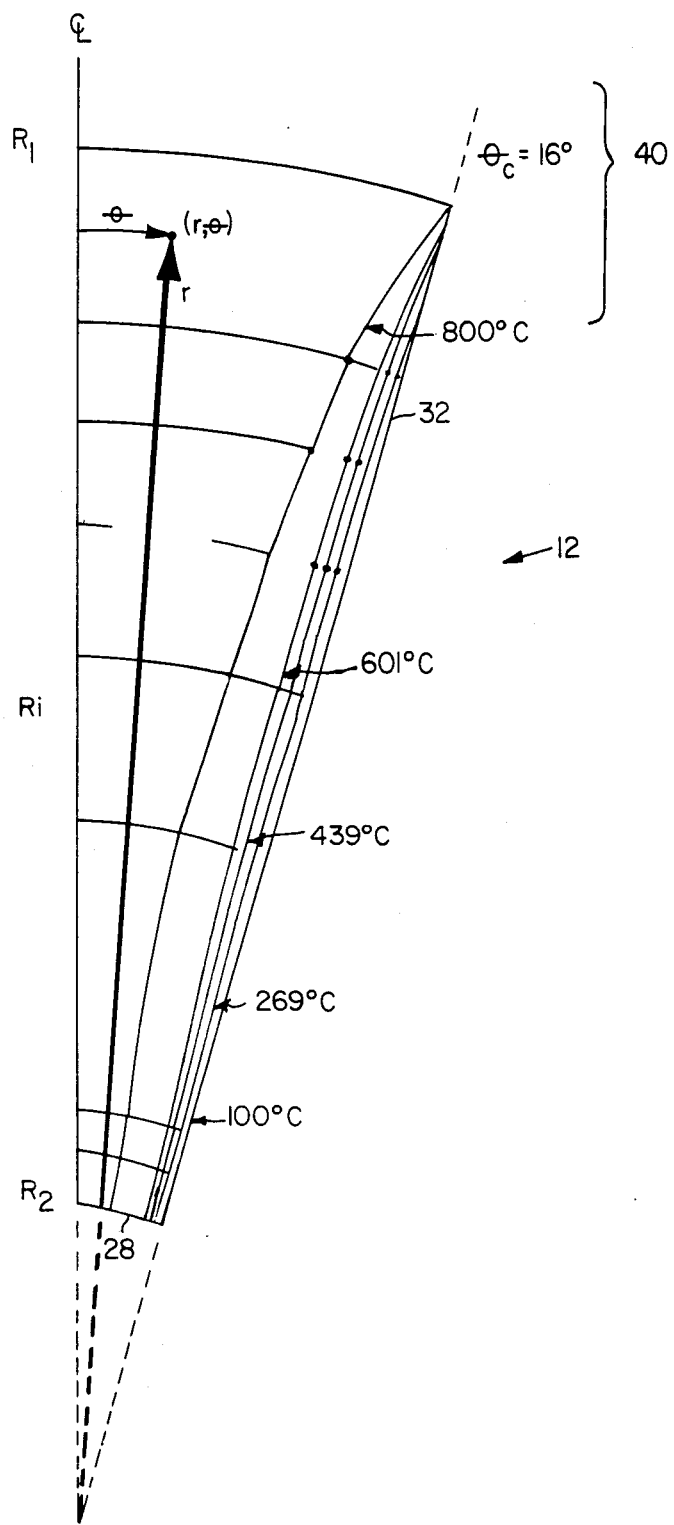
FIG. 3 is a section of a polar graph showing the calculated temperature profiles from the wall of the discharge cone, see FIG. 1.

FIG. 3 shows a temperature profile for the particles near the wall 32 of conical section 12 as calculated from a mathematical model for the same material, wall surface, and dimensions as used for FIG. 2. This assumes all particles at $R_1$ are at a uniform temperature of 800° C. One can see from the 800° C. isotherm that most of the particles are discharged without any cooling (in spite of the cooling applied to the walls to improve the discharge flow characteristics). This explains the fact that the average temperature of the particles at the outlet 28 in this example is 697° C.

Surprisingly, it has been found that this boundary layer is rather thin compared to the dimensions of the furnace because of the low value of the thermal diffusivity of the bed of DRI particles. This permits almost all particles to remain hot while those relatively few particles in contact with or very near the wall are cooled down so that their flow characteristics produce mass flow within all regions of the furnace. As the bed of particles descends, the velocity at the wall increases maintaining a boundary layer as shown in FIG. 3. Finally, after the particles exit from the furnace, they typically will be remixed during further handling so that the cooled particles are reheated by the rest of the particles. In this way, the temperature is homogenous and adequate for further hot processing of DRI, for example, hot briquetting or immediate melting.

What is claimed is:

1. A method for gaseous reduction of particulate iron ore, in the form of lumps, pellets or mixtures thereof, comprising reducing at temperatures above 700° C. a vertically-desecending mass-flow moving bed of said particlulate iron ore in a reduction zone, convergingly tapering the bed of resulting reduced particles in a lower discharge zone down to at least one discharge outlet, said discharge zone being defined by a relatively-smooth confining surface, discharging the reduced particles from said discharge outlets at an average temperature above 500° C., cooling at least an upper portion of said confining surface sufficiently to cool the reduced particles in contact with said surface at a rate and to a degree adequate to decrease by reason of said cooling the angle of friction of said particles relative to said surface and yet with little or no cooling of the central core of particles in said discharge zone, thereby substantially shortening the height of the discharge zone necessary to maintain a mass-flow pattern in said reduction zone and said discharge zone.

2. The method of claim 1, wherein said discharge zone has a single outlet and said confining surface is conical in shape.

3. The method of claim 2, wherein said confining surface has a conical angle which ranges between 10° and 20° with respect to the vertical.

4. A method according to claim 3, wherein said cooling is of an upper portion of said wall, and the temperatures of the particles contacting the relatively lower portion of said wall are in a temperature range of between 50° C. and 400° C.

5. A method according to claim 2, wherein said confining surface is the internal surface of a metallic wall and said cooling of at least a portion of said surface is carried out by circulating a cooling fluid in contact with said wall.

6. A method according to claim 5, wherein said cooling fluid is water.

7. A method according to claim 6, wherein said cooling is of an upper portion of said wall, and the temperatures of the particles contacting the relatively lower portion of said wall are in a temperature range of between 100° C. and 300° C.

8. A method according to claim 6, wherein said cooling is of an upper portion of said wall, and further comprising insulating a relatively lower portion of said wall to reduce heat loss from said lower portion.

9. A method according to claim 2, wherein a plurality of separately controllable cooling zones are defined concentrically adjacent to one another along said wall, and the cooling of said zones is selectively controlled so as to maintain said mass-flow pattern and the desired average discharge temperature of said reduced particles.

10. A method according to claim 9, wherein said selective control is made by regulating the relative amount of cooling fluid circulating in contact with said separate zones of said wall.

11. A method according to claim 10, wherein at least one cooling fluid is water.

12. A method for gaseous reduction of particulate iron ore, in the form of lumps, pellets or mixtures thereof, comprising reducing at temperatures above 700° C. a vertically-descending mass-flow moving bed of said particulate iron ore in a reduction zone, convergingly tapering the bed of resulting reduced particles in a lower discharge zone down to at least one discharge outlet, discharging the reduced particles from said discharge outlets at an average temperature above 700° C., said discharge zone being defined by a relatively-smooth confining surface, cooling at least an upper portion of said confining surface sufficiently to cool the reduced particles in contact with said surface at a rate and to a degree adequate to increase by reason of said cooling the effective flow rate of particles at said surface relative to the flow rate in the absence of such cooling, there being little or no cooling of the central core of particles in said discharge zone, thereby substantially shortening the height of the discharge zone necessary to maintain a mass-flow pattern in said reduction zone and said discharge zone.

13. Apparatus for the gaseous reduction of particulate iron ore in the form of lumps, pellets or mixtures thereof, wherein said reduction is carried out at temperatures above 700° C., comprising a vertical shaft furnace, an upper reducing portion of said furnace adapted to accommodate a moving bed of said iron ore particles descending by gravity with a substantially plug-flow pattern therethrough, a lower section of said furnace which tapers downwardly in a generally conical shape to a conical apex, an outlet discharge orifice at the conical apex of said lower section, said lower section having a conical wall with a metallic relatively smooth internal surface, localized cooling means for cooling at least a portion of said wall of said lower section to lower substantially the initial temperature of such reduced particles as are in contact with or at least closely adjacent to said wall without permitting any generalized active cooling of such moving bed of reduced particles as are contained in said lower section, the conical angle to the vertical of said lower section being greater than would permit effective mass-flow through the reducing portion and the lower section of said furnace in the absence of any active cooling of said lower section, and said angle being less than would prevent mass-flow through the reducing portion and the lower section of said furnace in the presence of said localized cooling means.

14. Apparatus according to claim 13, wherein said cooling means is a heat-exchanging jacket through which cooling fluid is circulated in contact with at least a portion of said wall of said lower section.

15. Apparatus according to claim 13, wherein said cooling means comprises a plurality of means for selectively and separately cooling predetermined zones of said wall of said lower section.

16. An apparatus according to claim 13, wherein said conical wall has a conical angle which ranges between 10° and 20° with respect to the vertical.

17. Apparatus for the gaseous reduction of particulate iron ore in the form of lumps, pellets or mixtures thereof, wherein said reduction is carried out at temperatures above 700° C., and the resulting reduced particles are discharged from said furnace at an average temperature above 500° C., comprising a vertical shaft furnace, a reducing portion of said furnace shaped to accommodate a moving bed of said iron ore particles descending by gravity with a substantially plug flow pattern therethrough, a lower section of said furnace which tapers downwardly in a generally conical shape to a conical apex, an outlet discharge orifice at the conical apex of said lower section, said lower section having a conical wall with a metallic relatively smooth internal surface, localized cooling means for cooling at least an upper portion of said wall of said lower section to lower rapidly the temperature of such reduced particles as are in contact with said wall to those values effective to permit a shortening of the height of the lower section needed to maintain a mass-flow in said reducing portion and in said conical lower section relative to the minimum height needed in the absence of such cooling means, and the lower portion of said conical lower section being insulated to reduce any further unnecessary heat loss by particles flowing through said lower portion.

18. Apparatus according to claim 17, wherein the conical angle to the vertical of said lower section is greater than would permit effective mass-flow through the reducing portion and lower section of said furnace in the absence of any active cooling of said lower section, and said angle is less than would prevent such mass-flow in the presence of said localized cooling means.

19. An apparatus according to claim 17, wherein said localized cooling means comprises a plurality of separate adjacent cooling jackets selectively and separately cooling predetermined zones of said wall in the lower section.

20. In a process for the direct gaseous reduction of particulate iron ore to sponge iron which comprises feeding the ore in the form of lumps, pellets or mixtures thereof to a vertically arranged reduction reactor, causing the ore to descend in a mass-flow moving bed through said reactor including a reduction section of the reactor in contact with an upwardly flowing hot reducing gas to form hot sponge iron particles and then causing the hot sponge iron particles to flow downwardly through a discharge section of the reactor having a conical wall that converges downwardly to a discharge opening at the bottom of the reactor, the improvement which comprises forming at least a part of said discharge section wall of a heat-transmitting metal having a smooth internal surface and controllably actively cooling at least the upper portion of said metal wall to cool substantially the sponge iron layer adjacent thereto without substantially cooling the main body of sponge iron in said discharge section.

* * * * *